Dec. 20, 1960
T. LODE
2,965,832
ELECTRIC WAVE CIRCUIT
Filed Oct. 3, 1957
2 Sheets-Sheet 1
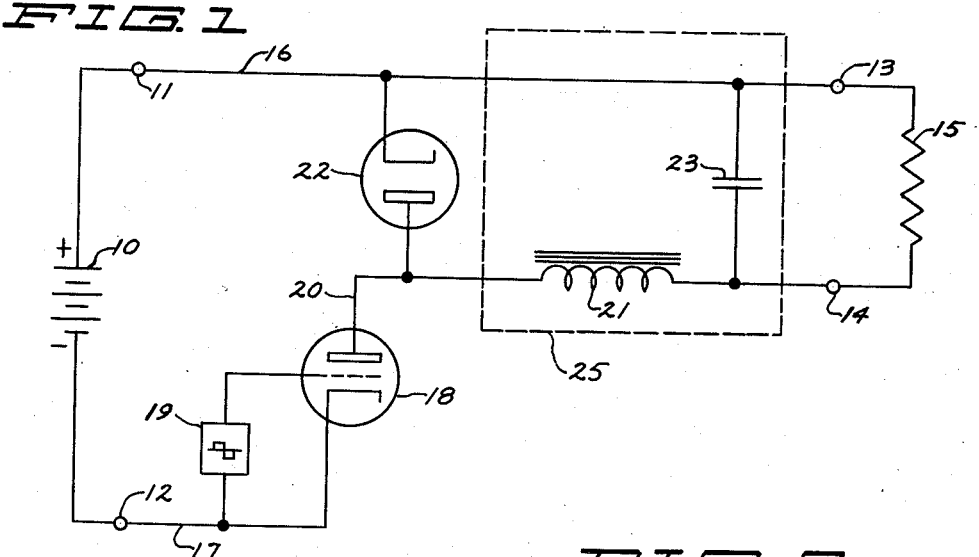
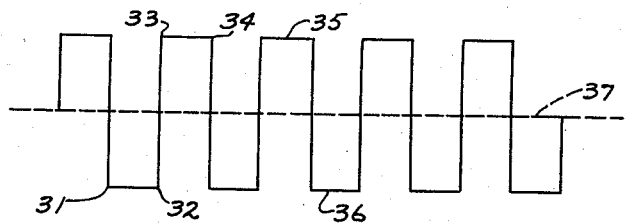
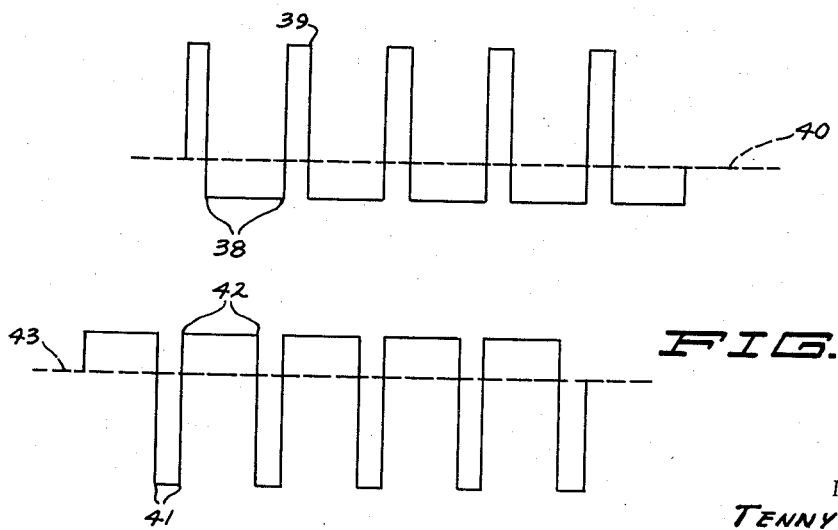
INVENTOR.
TENNY LODE
BY
Braddock and Braddock
ATTORNEYS Dec. 20, 1960     T. LODE     2,965,832
ELECTRIC WAVE CIRCUIT
Filed Oct. 3, 1957     2 Sheets-Sheet 2
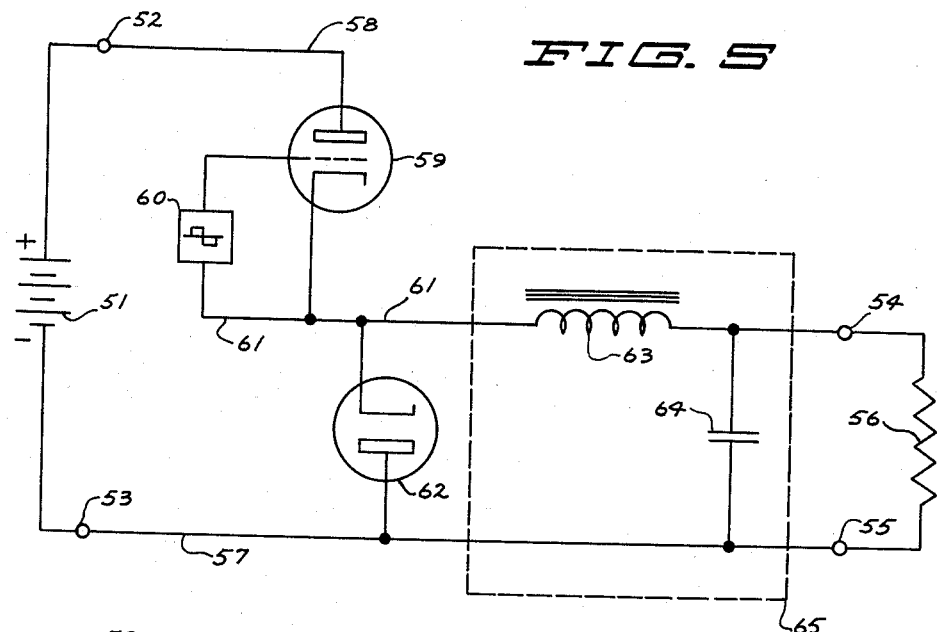
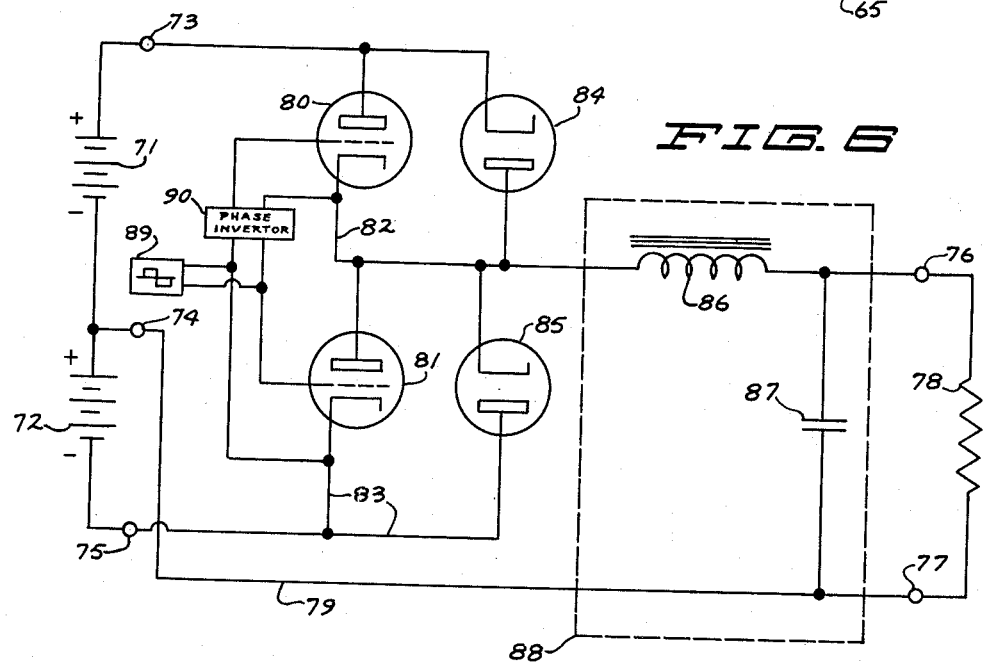
INVENTOR.
*TENNY LODE*
BY
*Braddock and Braddock*
ATTORNEYS

United States Patent Office 2,965,832
Patented Dec. 20, 1960

2,965,832

ELECTRIC WAVE CIRCUIT

Tenny Lode, St. Paul, Minn.
(Box 4341, Minneapolis 18, Minn.)

Filed Oct. 3, 1957, Ser. No. 687,961

8 Claims. (Cl. 323—18)

This is a continuation-in-part of my co-pending application for Electric Wave Circuit, Serial No. 451,094, filed August 20, 1954, now abandoned.

This invention relates to the generation of electrical signals of controlled magnitude.

The voltage output of a simple D.C. power supply is not necessarily constant, and in many instances (for example, in electronic computing equipment) must be regulated or stabilized. It is an object of this invention to efficiently produce a regulated voltage from a non-constant voltage source.

A variable unidirectional potential is often required, as in a plate modulated radio transmitter. It is an object of this invention to efficiently generate such a variable unidirectional potential.

A generalized object of this invention is to efficiently produce electrical potentials and currents of controlled and variable magnitude.

A circuit of the present invention includes an inductance, the first end of which is connected to the first terminal of an output load impedance, a path for current flow between a second end of said inductance and a first terminal of a unidirectional voltage source, switching means for alternately establishing and interrupting current flow in said path, a path for current flow between a second terminal of said output load impedance and a second terminal of said unidirectional voltage source, and a unidirectional conducting element connected between said second terminal of said load impedance and said second end of said inductance. The average voltage appearing across the load impedance, or the current flowing therethrough, may be controlled by varying the relative durations of the conducting and non-conducting periods of the switch means controlled current path.

In the drawings,

Fig. 1 is a schematic representation illustrating a first form of the present invention;

Fig. 2 is a diagrammatic representation of a first wave form such as may be employed in the circuit of Fig. 1 in producing a medium voltage output;

Fig. 3 is a diagrammatic representation of a second wave form such as may be employed in the circuit of Fig. 1 in producing a lesser voltage output;

Fig. 4 is a diagrammatic representation of a third wave form such as may be employed in the circuit of Fig. 1 in producing a greater voltage output;

Fig. 5 is a schematic representation illustrating a second form of the present invention; and Fig. 6 is a schematic representation illustrating a third form of the present invention.

Referring now to Fig. 1, a unidirectional voltage source 10 is connected to a positive input terminal 11 and a negative input terminal 12. A positive output terminal 13 and a negative output terminal 14 are connected to a load resistance 15. Common line 16 extends from terminal 11 to terminal 13 and a line 17 extends from terminal 12 to a cathode of a control tube 18. A complex wave source 19 is connected between a grid of tube 18 and the line 17. An anode of tube 18 is connected to a line 20 which extends to one side of an inductor 21. An anode of a rectifier tube 22 is connected to line 20 and a cathode thereof to the line 16. The other side of the inductor 21 is connected to terminal 14 and a capacitor 23 is connected between terminals 13 and 14.

Inductor 21 and capacitor 23 in combination form filter 25.

In normal operation, wave source 19 generates a periodic switching wave such that control tube 18 is alternately fully conducting or completely non-conducting. In general, this switching wave will be of a form known as a rectangular wave. In a particular embodiment of wave source 19 may be a variable width pulse generator. Fig. 2 illustrates a representative voltage wave form appearing on line 20, with respect to the potential of line 16. At the beginning of a cycle, control tube 18 is switched into a state of full conduction and the voltage on line 20 is approximately that of the negative input terminal 12, as indicated by point 31. Electrons flow from the negative terminal 12, through line 17, tube 18, line 20, inductor 21, terminal 14, load resistance 15, terminal 13 and line 16 to positive input terminal 11. This condition continues until point 32 is reached, at which control tube 18 is cut off by the switching wave developed by wave source 19 and the voltage on line 20 is driven positive to point 33 by the reactive voltage across inductor 21. This causes rectifier tube 22 to conduct, and maintains current flow through inductor 21. Current then flows through inductor 21, terminal 14, load resistance 15, terminal 13, line 16, rectifier tube 22 and line 20 back to the inductor 21. This condition continues until the control tube 18 is again switched into conduction at point 34 and the cycle begins anew. Capacitor 23 serves as a smoothing filter element across the circuit output.

The voltage input on line 20 to filter 25, with respect to line 16, alternates between a level 35 approximately equal to the voltage on line 16, and a level 36 approximately equal to the voltage on line 17. Because of the averaging effect of filter 25, the voltage output across load resistance 15 will be approximately the time average of the voltage appearing on line 20. If, as indicated in Fig. 2, the conduction period 31, 32 of control tube 19 is equal to the non-conduction period 33—34, the output voltage at terminal 14, with respect to terminal 13, will be approximately half the negative potential at terminal 12 with respect to the terminal 11. This is indicated by the dotted line 37. Tubes 18 and 22 are either non-conducting or conducting at minimal voltage drop except for momentary transitions. Hence the circuit efficiency is high.

If, as shown in Fig. 3, the conduction period 38 of control tube 18 is greater than the non-conduction period 39, the output voltage at the terminal 14 with respect to the terminal 13 will be more negative than half the negative potential at terminal 12 with respect to terminal 11. This output voltage is indicated by the dotted line 40.

If, as seen in Fig. 4, the conduction period 41 of the control tube 18 is less than the non-conduction period 42 thereof, the output voltage at terminal 14 with respect to terminal 13 will be less negative than half of the negative potential at the terminal 12 with respect to the terminal 11. This output voltage is indicated by the dotted line 43. Thus the circuit output voltage across load 15 may be varied by appropriate control of the switching wave source to vary the ratio of the conduction and non-conduction periods of control tube 18.

Referring now to Fig. 5, in a second form of the present invention a unidirectional voltage source 51 is connected to a positive input terminal 52 and a negative input terminal 53. A positive output terminal 54 and a negative output terminal 55 are each connected to opposite ends of a load resistance 56. A common line 57 extends between terminal 53 and terminal 55, and a line 58 extends from positive input terminal 52 to an anode of a control tube 59. A complex wave source 60 is connected between a control grid of the control tube 59 and a line 61. This line 61 extends to a cathode of the control tube 59 and to one side of an inductor 63. An anode of a rectifier tube 62 is connected to the line 57 and the cathode thereof to the line 61. The other side of inductor 63 is connected to output terminal 54, and a capacitor 64 is connected between terminals 54 and 55. Inductor 63 and capacitor 64 in combination comprise a filter 65.

The operation of the circuit of Fig. 5 is similar to the operation of the circuit of Fig. 1, except that the circuit has been rearranged so that the output with respect to the common line 57 appears as a controlled positive voltage at terminal 54, rather than as a controlled negative voltage at terminal 14 as was the case in connection with the embodiment of the invention illustrated in Fig. 1.

Referring now to Fig. 6, in a third form of the present invention, the first unidirectional voltage source 71 is connected to a positive input terminal 73 and a neutral input terminal 74. A second unidirectional voltage source 72 is also connected to the neutral input terminal 74 and is connected to a negative input terminal 75. A load resistance 78 is connected to a first output terminal 76 and to a second output terminal 77. A common line 79 is connected between neutral input terminal 74 and second output terminal 77. A first grid controlled electron control tube 80 has an anode connected to the input terminal 73 and a cathode connected to a line 82. A second grid controlled electron control tube 81 has an anode connected to the line 82 and a cathode connected to a line 83 which is connected to negative input terminal 75. A first rectifier tube 84 has a cathode connected to the input terminal 73 and an anode connected to the line 82; while a second rectifier tube 85 has a cathode connected to the line 82 and an anode to the line 83.

Line 82 connects to one side of an inductor 86, and the other side of this inductor is connected to output terminal 76. A capacitor 87 is connected between the output terminals 76 and 77. Inductor 86 and capacitor 87 in combination form a filter 88.

A complex wave source 89 is connected through a phase inverter 90 to the cathode and a control grid of control tube 80. This complex wave source 89 is also connected directly to the cathode and a grid of the control tube 81.

In the third form of the invention as illustrated in Fig. 6, a combination of the circuits illustrated in Figs. 1 and 5 has been adapted to produce a voltage of either positive or negative polarity as desired across load resistance 78. Control tubes 80 and 81 are switched alternately and oppositely between conducting and non-conducting states by the complex wave source 89. If the switching wave forms developed by wave source 89 and the phase inverter 90 are such as to cause control tubes 80 and 81 each to conduct one half of the time, the average voltage appearing on the line 82 with respect to the line 79 will be zero. A voltage developed across load 78 will similarly be zero. If the switching wave forms developed by wave source 89 and phase inverter 90 are such as to cause control tube 80 to conduct more than half-time and control tube 81 to conduct less than half-time, control tube 80 and rectifier tube 85 will act as does the control tube and rectifier of the form of the invention illustrated in Fig. 5 to produce a positive voltage at terminal 76 with respect to terminal 77. Conversely, if the switching wave forms developed are such as to cause control tube 80 to conduct less than half-time and control tube 81 to conduct more than half-time, control tube 81 and rectifier tube 84 will act as do the corresponding tubes in the circuit of the form of the invention illustrated in Fig. 1 to produce a negative voltage at terminal 76 with respect to terminal 77. Thus by altering the switching wave form developed by wave source 89, the voltage at terminal 76 with respect to terminal 77 may be controlled in magnitude and polarity as desired.

It is to be understood that the output load need not be entirely resistive in nature. The load may be reactive or may be a complex impedance and the circuit would still come within the spirit of the invention and the scope of the claims which follow.

While simple vacuum tube elements have been disclosed, it is to be understood that more complex vacuum tube structures, transistors, semiconductor diodes, or other switching devices may be employed. The output low-pass filter disclosed may be modified for particular applications.

What is claimed is:

1. A circuit for producing a controlled voltage including an inductance, a load having a first end thereof connected to a first end of said inductance, a unidirectional voltage source, a unidirectional conducting element having a first side thereof connected to a second end of said inductance, a first path for current flow between a second side of said unidirectional conducting element, a first terminal of said unidirectional voltage source and a second side of said load, a second path for current flow between a second terminal of said unidirectional voltage source and said second end of said inductance, and switching means for alternately establishing and interrupting said second path.

2. A circuit for producing a controlled, unidirectional voltage including a first terminal, an inductance, a load connected between said first terminal and said inductance, a unidirectional conducting element connected between said first terminal and an end of said inductance opposite said load, a second terminal, means for maintaining said second terminal at a potential difference with respect to said first terminal, and switching means for alternately establishing and interrupting a path for current flow between said end of said inductance opposite said load and said second terminal.

3. The combination as specified in claim 2 wherein said switching means is constituted as an electronic valve.

4. A circuit for producing a stabilized, essentially constant, unidirectional voltage including first and second input terminals, a rectifier, a load, an inductance, an electronic valve, a unidirectional voltage source, and a source of alternating voltage, said rectifier and said load each being connected to said first input terminal, said inductance being connected between said rectifier and said load, said electronic valve being connected between said inductance and said second input terminal, said unidirectional voltage source being connected between said two input terminals, and said source of alternating voltage being connected between a control electrode and an input electrode of said electronic valve.

5. The combination as specified in claim 4 wherein said rectifier includes a cathode connected to said first input terminal and a plate connected to said inductance, wherein said electronic valve is constituted as a triode having a plate connected to said inductance and a cathode connected to said second input terminal, and wherein said unidirectional voltage source is connected to maintain said second input terminal at a negative potential with respect to said first input terminal.

6. The combination as specified in claim 4 wherein said rectifier includes a cathode connected to said inductance and a plate connected to said first input terminal, wherein said electronic valve is constituted as a triode having a plate connected to said second input terminal and a cathode connected to said inductance, and wherein said unidirectional voltage source is connected to maintain said second input terminal at a positive potential with respect to said first input terminal.

7. A circuit for producing a controlled voltage including an inductance, a load having a first end thereof connected to a first end of said inductance, first, second and third input terminals, means for maintaining said first terminal more positive than said second terminal and said second terminal more positive than said third terminal, a first unidirectional conducting element connected between said first input terminal and a second end of said inductance for passing current from said first input terminal to said inductance, a second unidirectional conducting element connected between said second end of said inductance and said third input terminal for passing current from said inductance to said third terminal, an electrical connection between said second terminal and a second end of said load, a first path for current in parallel with said first unidirectional element and flowing in direction from said inductance to said first terminal, a second path for current in parallel with said second unidirection element and flowing in direction from said third terminal to said inductance, switching means for alternating between a first condition in which said first current path is established and said second current path is interrupted and a second condition in which said first current path is interrupted and said second current path is established, and means for controlling said switching means to control the ratio of the time of existence of said first condition to the time of existence of said second condition.

8. A circuit for producing a controlled voltage across a load including an inductance, a load resistor, a unidirectional low voltage source, a unidirectional conducting element, and switching means for alternately opening and closing a circuit path, said load, said inductance, and said unidirectional conducting element being arranged in a first series loop, and said load, said inductance, said switching means and said voltage source being arranged in a second series loop.

References Cited in the file of this patent

UNITED STATES PATENTS

| | | |
|---|---|---|
| 2,085,100 | Knowles et al. | June 29, 1937 |
| 2,273,934 | Campbell | Feb. 24, 1942 |
| 2,782,867 | Hall | Feb. 26, 1957 |